Patented Jan. 7, 1936

2,026,566

UNITED STATES PATENT OFFICE 2,026,566

FREE CUTTING ALLOYS

Louis W. Kempf and Walter A. Dean, Cleveland, Ohio, assignors to Aluminum Company of America, Pittsburgh, Pa., a corporation of Pennsylvania No Drawing. Original application September 18, 1933, Serial No. 689,881. Divided and this application May 3, 1935, Serial No. 19,617

4 Claims. (Cl. 75—1)

This invention relates to aluminum base alloys and it is particularly concerned with those alloys containing silicon as a major alloy component.

This application is a division of our copending application Serial No. 689,881, filed September 18, 1933.

Aluminum base alloys containing from about 3 to 15 percent of silicon have been widely used in cast, extruded and wrought forms because of such desirable casting characteristics as fluidity and low solidification shrinkage of the molten alloy, combined with a good workability of the solid metal if a wrought article is to be made. The alloys also possess a low coefficient of thermal expansion and satisfactory physical properties, particularly the tensile strength and elongation. In spite of these advantageous properties, the field of utility of these alloys has been restricted because of their inherently poor machining quality and consequent increased cost of finishing articles of these alloys by machining operations such as boring, drilling, shaping, planing, or lathe-cutting. Difficulty in machining is made evident through an excessive cutting tool wear which necessitates a frequent resharpening. Poor machinability is also manifested in a rough irregular machined surface and the tendency to form long chips that may foul the cutting tool or operating parts of the machine. Aluminum-silicon alloys are furthermore quite likely to have hard particles of elementary silicon distributed throughout the alloy matrix which seriously interfere with smooth cutting of the article being machined. These difficulties are most readily apparent in machining operations conducted on a large scale such as the manufacture of pistons for internal combustion engines where it has been found desirable to use an expensive cutting tool material to insure long tool life and a satisfactory machined surface.

It is accordingly one of the objects of our invention to make aluminum-silicon alloys amenable to machining operations on a large scale without encountering the disadvantages hereinbefore referred to. A specific purpose is to diminish the irregularity in cut caused by the hard silicon particles and to produce a smooth pleasing surface on the machined article. A further object is to accomplish the foregoing ends without disadvantageously affecting the physical properties of the alloy.

Our invention is predicated upon the discovery that the addition of cadmium and/or bismuth to aluminum-silicon alloys containing from about 3 to 15 per cent silicon greatly improves the machining quality of this type of aluminum alloy. The improvement is especially marked in those alloys containing from about 10 to 15 per cent of silicon which have heretofore been particularly difficult to machine. We have found that the addition of from about 1.5 to 6 per cent of cadmium and/or bismuth to aluminum-silicon alloys imparts a machinability to the alloy which renders it adaptable to all ordinary machining requirements. For the purpose of our invention, cadmium and bismuth are substantially equivalent and are considered to constitute a class of elements with respect to their effect upon the machining quality of aluminum-silicon alloys.

The improvement in machining characteristics referred to above may be brought about by the addition of between about 1.5 and 6 per cent of cadmium or bismuth to aluminum base alloys containing from about 3 to 15 per cent silicon, but for many applications we prefer to use less than 4 per cent of either cadmium or bismuth. The effect on machinability of these added elements is manifested by the smooth flow of chips from the article being machined, the short breakable chips that are produced, the absence of galling or unevenness of cut, resulting in an irregular surface of dull appearance, and the increase in cutting speed which is possible under such favorable conditions. As an example of an alloy possessing these properties, the following composition may be cited: 12 per cent silicon, 4 per cent cadmium, balance substantially all aluminum. A similar alloy containing 4 per cent of bismuth likewise shows an improved machinability compared to an aluminum-silicon alloy containing no cadmium, bismuth or other elements designed to affect the cutting characteristics.

The elements cadmium and bismuth may not only be used separately in alloys of the type herein disclosed but may be effectively employed in combination. It has been found that a better machinability is frequently obtained when the cadmium and bismuth are simultaneously present. For example, an alloy containing 12 per cent silicon, 2 per cent cadmium, and 2 per cent bismuth, balance substantially aluminum, machined more readily than the same alloy with only 4 per cent of cadmium or bismuth present. It is, therefore, possible to obtain a better machining quality with a given total amount of cadmium and bismuth than if an equivalent amount of a single element is used. The total combined amount of the two elements should not, in any case, exceed 6 per cent and preferably 4 per cent is the maximum content of bismuth and cadmium that should be used. It is also preferred to add these elements in approximately equal proportions although beneficial results are obtained if other proportions are adopted.

The tensile properties of the alloys herein described are not materially affected by the addition of cadmium and/or bismuth in amounts of less than 4 per cent but there is a decline in strength if larger quantities are added. However, the machinability of the alloy is somewhat better in such cases which compensates in part for any loss in strength. The tensile properties are likewise affected if both elements are present and the total amount of cadmium and bismuth exceeds about 4 per cent.

The cadmium and bismuth may be most conveniently added to the molten aluminum-silicon alloy in solid metallic form. Other methods of making alloy additions practiced by those skilled in the art yield equally satisfactory results. If the amount of bismuth to be added exceeds about 1.5 per cent, the melt should be heated somewhat above ordinary temperatures and vigorously stirred to assure a uniform mixture. When cadmium is added, the temperature should not go above 1400° F. if excessive volatilization is to be avoided. The method of adding bismuth to aluminum or its alloys here referred to is more fully described in co-pending application, Serial No. 689,885 now Patent No. 1,959,029, granted May 15, 1934.

The term "aluminum" used herein and in the appended claims embrace the usual impurities found in aluminum ingot of commercial grade, or picked up in the course of the usual handling operations incident to ordinary melting practice.

The alloys herein disclosed may be subjected to the usual thermal treatments familiar to those skilled in the art for the purpose of improving or altering their physical characteristics.

We claim:

1. An aluminum base alloy containing about 12 per cent of silicon, 2 per cent of cadmium and 2 per cent of bismuth, the balance being aluminum.

2. An aluminum base alloy containing from about 3 to 15 per cent of silicon and both of the elements bismuth and cadmium in amount between 1.5 and 4.5 per cent of each, the total amount of bismuth and cadmium being not in excess of 6 per cent, the balance being aluminum.

3. An aluminum base alloy containing from about 3 to 15 per cent of silicon and both of the elements bismuth and cadmium in amount between 1.5 and 2.5 per cent of each, the total amount of bismuth and cadmium being not in excess of 4 per cent, the balance being aluminum.

4. An aluminum base alloy containing from about 10 to 15 per cent of silicon and both of the elements bismuth and cadmium in amount between 1.5 and 4.5 per cent each, the total amount of bismuth and cadmium being not in excess of 6 per cent, the balance being aluminum.

LOUIS W. KEMPF.
WALTER A. DEAN.